United States Patent
Hamerly et al.

(10) Patent No.: US 6,483,957 B1
(45) Date of Patent: Nov. 19, 2002

(54) MEMS-BASED POLARIZATION MODE DISPERSION COMPENSATOR

(75) Inventors: Mike E. Hamerly, Vadnais Heights, MN (US); Robert G. Smith, Vadnais Heights, MN (US); Terry L. Smith, Roseville, MN (US); Silva K. Theiss, Woodbury, MN (US); Billy L. Weaver, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 118 days.

(21) Appl. No.: 09/771,765

(22) Filed: Jan. 29, 2001

(51) Int. Cl.[7] .................................................. G02B 6/00
(52) U.S. Cl. ............................ 385/11; 385/24; 385/39; 359/161
(58) Field of Search ............................... 385/11, 15, 24, 385/47, 39; 359/161

(56) References Cited

U.S. PATENT DOCUMENTS

| | | | |
|---|---|---|---|
| 4,954,789 A | 9/1990 | Sampsell | |
| 5,404,413 A | 4/1995 | Delavaux et al. | |
| 5,506,710 A | 4/1996 | Hamel | |

(List continued on next page.)

FOREIGN PATENT DOCUMENTS

| | | |
|---|---|---|
| EP | 0 658 988 A1 | 6/1995 |
| EP | 0 762 161 A1 | 3/1997 |
| EP | 0 771 121 A2 | 5/1997 |
| EP | 0 909 047 | 10/1997 |
| EP | 0 607 782 B1 | 7/1999 |
| EP | 0 948 152 | 10/1999 |
| EP | 0 964 237 A1 | 12/1999 |
| EP | 0 984 306 A1 | 3/2000 |
| JP | 60066492 | 4/1985 |
| JP | 9026518 | 1/1997 |
| WO | 93/09454 | 5/1993 |
| WO | 98/08121 | 2/1998 |
| WO | 98/33080 | 7/1998 |
| WO | 99/08142 | 2/1999 |
| WO | 99/21039 | 4/1999 |
| WO | 99/53363 | 10/1999 |
| WO | 99/66607 | 12/1999 |
| WO | 00/03505 | 1/2000 |
| WO | 00/10053 | 2/2000 |
| WO | 00/39629 | 7/2000 |

OTHER PUBLICATIONS

Koester et al., "MUMPS Design Handbook, Revision 5.0", Cronos Integrated Microsystems (2000).

Riza et al., "Digitally Controlled Fault–Tolerant Multiwavelength Programmable Fiber–Optic Attenuator Using a Two–Dimensional Digital Micromirror Device", 24 Optics Letters 282–284 (1999).

Ford et al., "Micromechanical Fiber–Optic Attenuator with 3 $\mu s$ Response", 16 Journal of Lightwave Technology 1663–1670 (1998).

Giles et al., "Low–Loss Channelized WDM Spectral Equalizer using Lightwave Micromachines and Autonomous Power Regulation", Optical Fiber Communication Conference, pp. PD31–1 through PD31–3 (1999).

(List continued on next page.)

Primary Examiner—Rodney Bovernick
Assistant Examiner—Sung Pa
(74) Attorney, Agent, or Firm—Scott A. Bardell

(57) ABSTRACT

A polarization mode separator separates the optical signal into a first polarized signal and a second differently polarized signal traveling along respective first and second paths. A first variable delay generator located along the first path is adapted to selectively provide a first propagation delay to the first polarized signal. The first variable delay generator includes at least two rotating micro-mirrors and one or more fixed mirrors constructed on a surface of a substrate. A controller is coupled to the first variable delay generator. The controller is adapted to monitor the polarization mode dispersion in the optical signal and to position the rotating micro-mirrors to direct the first polarized signal along one of the plurality of optical paths. A beam combiner combines the first and second signals to form an optical output signal substantially compensated for polarization mode dispersion.

21 Claims, 8 Drawing Sheets

U.S. PATENT DOCUMENTS

| | | |
|---|---|---|
| 5,555,330 A | 9/1996 | Pan et al. |
| 5,570,439 A | 10/1996 | Ido et al. |
| 5,596,448 A | 1/1997 | Onaka et al. |
| 5,612,805 A | 3/1997 | Fevrier et al. |
| 5,636,053 A | 6/1997 | Pan |
| 5,796,882 A | 8/1998 | Schmid |
| 5,822,100 A | 10/1998 | Robinson et al. |
| 5,850,492 A | 12/1998 | Morasca et al. |
| 5,859,939 A | 1/1999 | Fee et al. |
| 5,903,383 A | 5/1999 | Bernstein et al. |
| 5,930,414 A | 7/1999 | Fishman et al. |
| 5,943,155 A | 8/1999 | Goossen |
| 5,959,376 A | 9/1999 | Allen |
| 5,960,133 A | 9/1999 | Tomlinson |
| 5,974,206 A | 10/1999 | Bricheno et al. |
| 5,982,554 A | 11/1999 | Goldstein et al. |
| 6,002,513 A | 12/1999 | Goossen et al. |
| 6,014,257 A | 1/2000 | Furlani et al. |
| 6,081,360 A | 1/2000 | Ishikawa et al. |
| 6,222,655 B1 | 4/2001 | Terahara |

OTHER PUBLICATIONS

Sumriddetchkajorn et al., "Micromachine–Based Fault–Tolerant High Resolution High–Speed Programmable Fiber–Optic Attuneator", ThQ1–1 University of Central Florida 240–242.

Andersen et al., "MEMS Variable Optical Attenuator for DWDM Optical Amplifies", WM17–1 260–262.

08122723 JP.

08095095 JP.

Goossen et al., "Optical Modulator with Independent Control of Attenuation and Spectral Tilt", IEEE Conference on Optical MEMS, pp. 73–74 (1998).

Butler et al., "Scanning and Rotating Micromirrors Using Thermal Actuators", 3131 SPIE 134–144 (1997).

Ozeki et al., "Polarization–Mode–Dispersion Equalization Experiment Using a Variable Equalizing Optical Circuit Controlled by a Pulse–Waveform–Comparison Algorithm", OFC '94 Technical Digest, paper TuN4, pp. 62–64, (1994).

Ono et al., "Polarization Control Method for Suppressing Polarization Mode Dispersion Influence in Optical Transmission Systems", Journal of Lightwave Technology, vol. 12, No. 5, pp. 89–91.

Takahasi et al., "Automatic Compensation Technique for Timesaving Fluctuating Polarizatin Mode Dispersion in In–Line Amplifier Systems", Electronic Letters, vol. 30, No. 4, pp. 348–349, (1994).

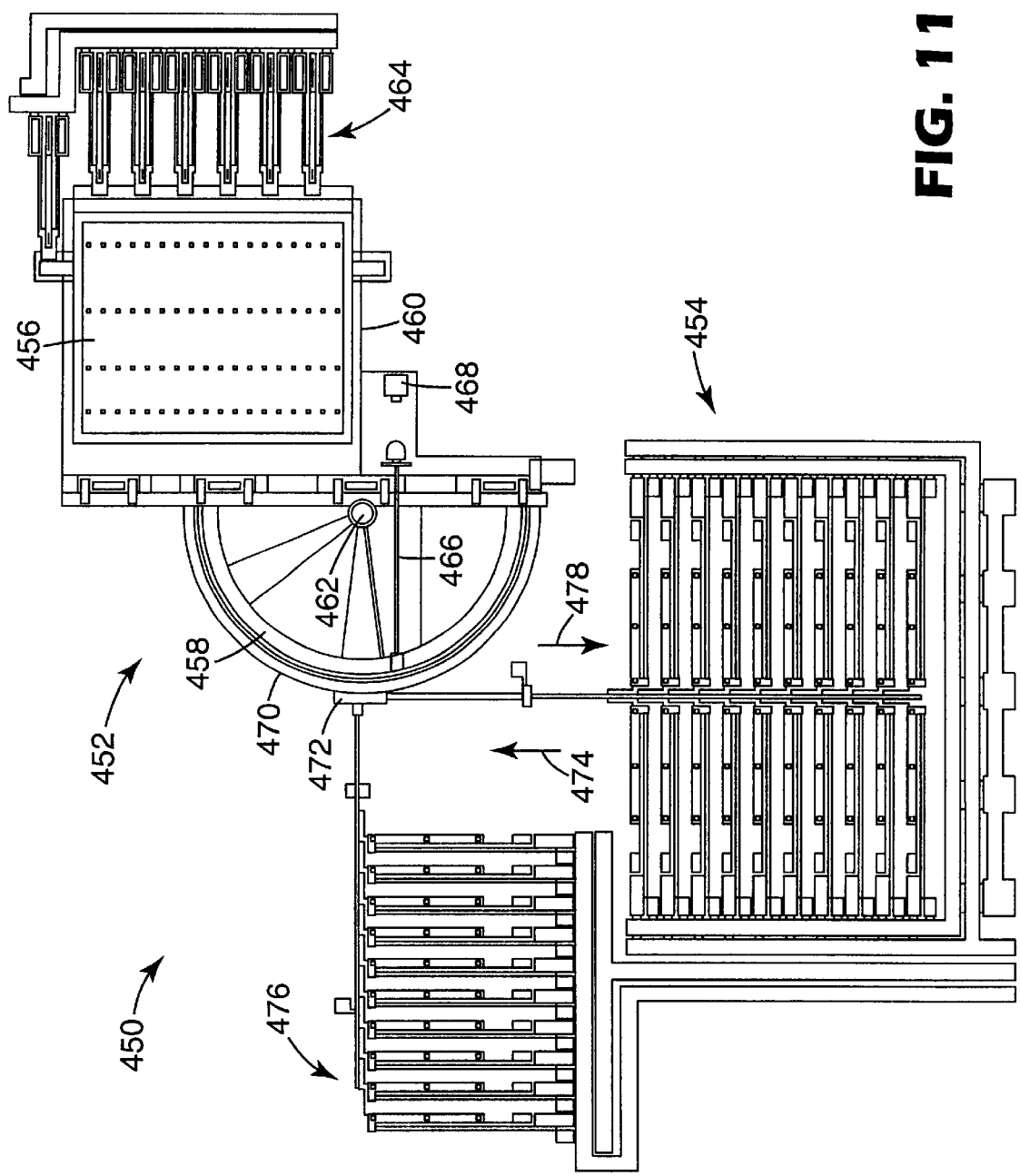

MEMS-BASED POLARIZATION MODE DISPERSION COMPENSATOR

FIELD OF THE INVENTION

The present polarization mode dispersion compensator is based on delay generators that use thermally actuated, rotating micro-mirrors to add well-defined increments of delay to polarized portions of an optical signal.

BACKGROUND OF THE INVENTION

Fiber optics technology is revolutionizing the telecommunications field. The main driving force is the promise of extremely high communications bandwidth. At high bandwidths, a single beam of modulated laser light can carry vast amounts of information equal to hundreds of thousands of phone calls or hundreds of video channels. However, pulse broadening limits the effective bandwidth and propagation distance of an optical communication signal. Because of the inherent dispersive nature of an optical fiber medium, all portions of a light pulse do not travel the same distance through an optical fiber causing pulse broadening.

FIG. 1 illustrates how pulse broadening arises from varying light propagation delays, which eventually distorts light output. Digital input pulses 10 are input to an optical fiber medium 11. The amplitude-modulated pulses are generated by a modulated laser source, such as a direct-modulated laser or an externally-modulated laser.

Different portions of a light pulse encounter varying propagation delays arising from the varying lengths of reflected paths within optical fiber 11. For clarity, three paths are illustrated which correspond to a relatively straight, short path 10a, a reflected, intermediate length path 10b, and a relatively long, reflected path 10c. Due to the varying propagation delays (see, e.g., the Δt delay in arrival time between 10a and 10b), the combined optical output is distorted. Thus, a photoreceptor detecting the output pulses 10a–10c will generate a distorted output 12.

As shown in FIG. 2, such pulse broadening can lead to intersymbol confusion. "Pulse broadening" is called "dispersion" or "spreading" because of the non-uniform way in which parts of the incident signal 20 propagate through a dispersive fiber medium. In a mild form of dispersion, the transitions between ON and OFF states observed at a receiver are not as abrupt and distinct as the transitions that were originated by a transmitting laser. More severe blurring in the time domain limits the useful bandwidth of the path.

In FIG. 2, dispersion effects have broadened two closely spaced pulses to the extent that they are almost indistinguishable, as indicated by a question mark in the output signal 22. This will cause an information bit to be received erroneously, with perhaps disastrous results on network communication and customer dissatisfaction.

Several refinements have been made to reduce dispersion and increase the useful bandwidth. First, single-mode fiber was developed having a slender core such that there is essentially only a single light path through the fiber. Secondly, the distributed feedback (DFB) laser was developed with an extremely narrow distribution of output wavelengths. This technique minimizes chromatic dispersion caused by the fact that different wavelengths traverse the length of the fiber over different periods of time. Finally, a dispersion-shifted fiber material was produced to minimize the increased time vs. wavelength dependency at a specific wavelength of fifteen hundred and fifty nanometers common in telecommunication applications.

Cumulatively, recent improvements in fiber materials and transmitter devices have reduced pulse dispersion and increased working bandwidth. Lightwave technology has advanced at such a pace that the bandwidth capabilities have more than doubled every two years. As a result, working bandwidths, expressed in terms of digital bit-per-second rates, have escalated from 500 Million bits per second (Mbps) to 10 Billion bits per second (Gbps).

These progressively more exotic refinements have brought the technology to a new bandwidth barrier: Polarization-Mode Dispersion (PMD). Previously, PMD was insignificant in magnitude relative to other dispersive effects, but now it is a limiting factor. It is well known that light can be polarized and that, for a given beam of light, this polarization can be expressed in terms of two orthogonal axes that are normal to the axis of propagation. As a beam of light propagates through a fiber, the light energy present along one such polarization may leak into the other polarization.

This leakage would normally be of little consequence (lightwave receivers will detect both polarizations), except that real-world fibers carry different polarizations at slightly different time delays due to reflection. This effect can be on the order of 10–20 picoseconds (ps) in a 100 km fiber and becomes important when the modulating pulses are 50–100 picoseconds in width. To complicate matters, the polarization dispersion within a given fiber changes as a function of time and temperature. Therefore, an effective PMD compensation mechanism must monitor and adapt to the changes so as to keep PMD to a minimum.

To nullify the effects of PMD, researchers have suggested application of an adaptive compensation device in an optical path at the receiving end just before the receiving transducer. These compensators typically employ a detector for analyzing the relative partitioning and delay of the incoming signal along two orthogonal polarizations. The compensators correct a data signal by purposefully adding delay selectively to one polarization or another. A controller interprets the findings of the delay analyzer and manipulates adjustable delay elements so as to compensate for the polarization-dependent delay differences caused by the imperfect fiber transmission path. However, these techniques are not practical in telecommunication applications, such as, long-haul optical fiber communication.

The variable delay elements are usually optical fibers that are either heated or squeezed to alter their propagation characteristics. While these elements are adaptable to laboratory electronic control techniques, they are inadequate in terms of reproducibility and predictability of response. They are also impractical for use in a commercial traffic-bearing fiber network wherein recovery time following an equipment or power failure should be minimized. (See, e.g., Ozeki, et al., "Polarization-mode-dispersion equalization experiment using a variable equalizing optical circuit controlled by a pulse-waveform-comparison algorithm," OFC'94 Technical Digest, paper TuN4, pp. 62–64; Ono, et al., "Polarization Control Method for Suppressing Polarization Mode Dispersion Influence in Optical Transmission Systems", Journal of Lightwave Technology, Vol. 12, No. 5, May 1994, pp. 89–91; Takahasi, et al., "Automatic Compensation Technique for Timewise Fluctuating Polarization Mode Dispersion in In-line Amplifier Systems", Electronics Letters, Vol. 30, No. 4, February 1994, pp. 348–49; and WO 93/09454, Rockwell, Marshall A.; Liquid Crystal Optical Waveguide Display System).

U.S. Pat. No. 5,859,939 (Fee et al.) discloses a polarization beam splitter that separates the optical data signal into first and second orthogonally polarized optical signals. A first variable time delay element provides a first incremental propagation delay for the first polarized optical signal. A second variable time delay element provides a second incremental propagation delay for the second polarized optical signal. The first and second variable time delay elements consist of a series of optical switches optically interconnected by different incremental lengths of optical fiber. For example, 2×2 optical switches are provided for switching between a reference fiber segment and a respective delay fiber segment to provide a relative incremental propagation delay. A controller controls optical switches in the first and second variable switching delay elements to set first and second incremental propagation delays. The transition to and from the optical switches is a source of signal loss.

What is needed is a PMD compensation method and system that is reliable, responsive, and effective in commercial telecommunication networks.

BRIEF SUMMARY OF THE INVENTION

The present invention provides a system and method for compensating for polarization mode dispersion (PMD) in an optical data signal using rotating micro-mirrors to provide incremental delays between different polarization modes of the optical data signal. The PMD compensator receives a signal and breaks the signal into its various polarization modes. A variable delay generator provides an appropriate time delay to one or more of the polarization modes. A controller monitors the polarization mode dispersion and positions rotating micro-mirrors to provide the required time delay.

In one embodiment, a polarization mode separator separates the optical data signal into first and second orthogonally polarized optical signals. Rotating micro-mirrors in a variable delay generator are positioned to direct the first orthogonally polarized optical signal to optical paths of various lengths. The longer the optical path, the longer the first propagation delay for the first polarized optical signal. In another embodiment, a variable delay generator is provided for each of the first and second orthogonally polarized optical signals. Consequently, delay can be introduced into the first and/or the second polarized optical signal.

In particular, the first and second polarized optical signals are incrementally delayed relative to one another so as to compensate for polarization mode dispersion. A beam combiner then combines the first and second polarized optical signals to form an optical output data signal that can be detected accurately and reliably by a receiver without the effects of polarization mode dispersion. In this way, optical data signals can be transmitted over greater distances along a long-haul fiber optic dispersive medium at even greater bit-rates and bandwidth.

In one aspect of the present invention, a beam splitter diverts a portion of an input optical data signal to a delay detector. The delay detector detects a relative delay between orthogonal polarization modes of the optical data signal due to polarization mode dispersion. The controller then uses the detected relative delay to control the rotating micro-mirrors in the variable delay generators so as to counteract the detected relative delay.

In one embodiment, a linkage mechanism is mechanically coupled to the two rotating micro-mirrors. A plurality of thermal actuators are mechanically coupled to the linkage mechanism. The linkage mechanism can rotate the micro-mirrors simultaneously in opposite directions. The linkage mechanism can also synchronize rotation of the micro-mirrors.

The present invention is also directed to a plurality of variable delay generators on the substrate and to an optical communication system including at least one apparatus for equalizing polarization mode dispersion.

Compared to other known technologies, the present invention is more reliable and predictable in its response and is therefore more mass-producible. Furthermore, it has an extremely fast response time that is independent of the degree of delay adjustment needed. This is a particular advantage in a mission-critical high data rate optical communications network.

BRIEF DESCRIPTION OF THE SEVERAL VIEWS OF THE DRAWING

Further features of the invention will become more apparent from the following detailed description of specific embodiments thereof when read in conjunction with the accompany drawings.

FIG. 11 is a top view of an alternate rotating micro-mirror in accordance with the present invention.

DETAILED DESCRIPTION OF THE INVENTION

Figure 1:
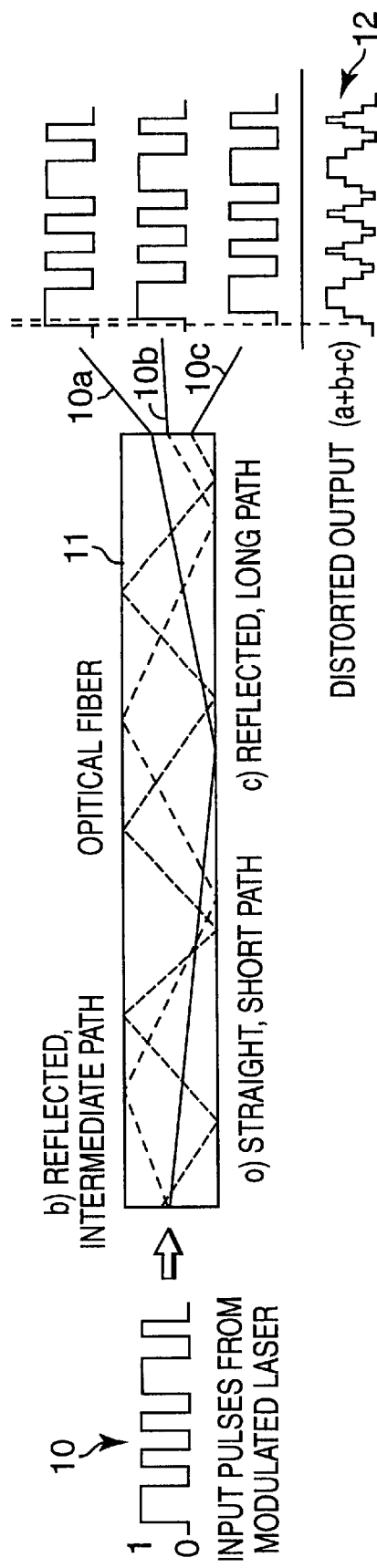
FIG. 1 illustrates pulse broadening through a dispersive optical fiber.
Figure 2:
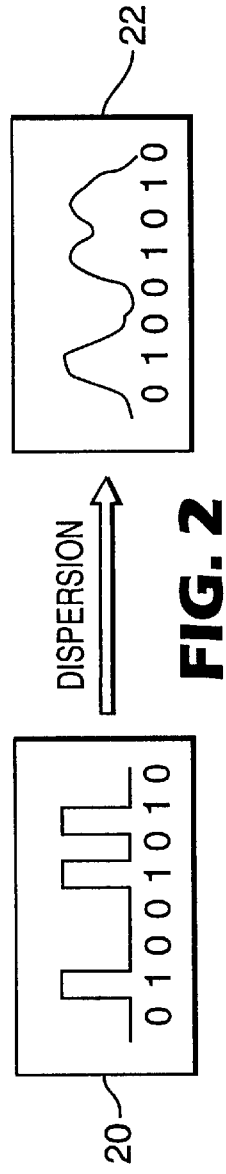
FIG. 2 shows the interference caused by pulse broadening.
Figure 3:
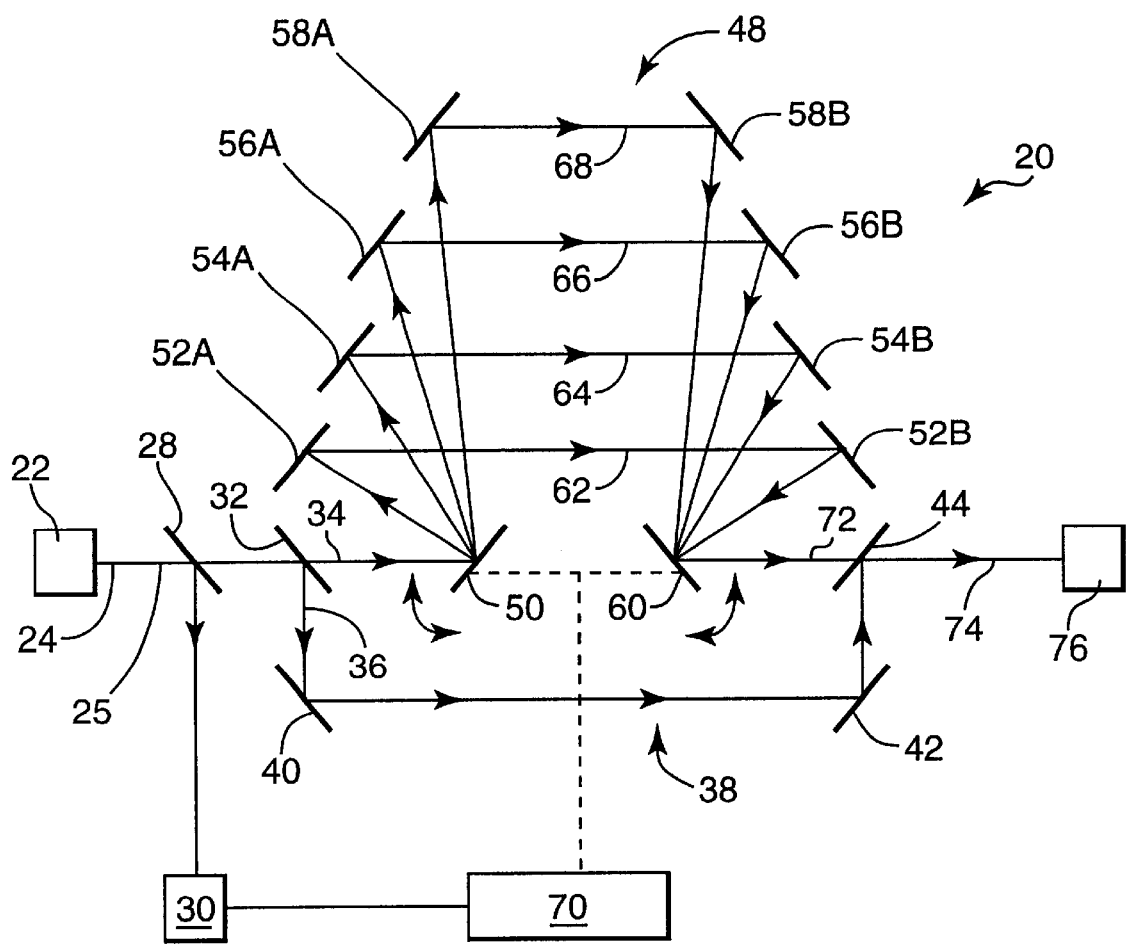
FIG. 3 is a schematic illustration of a MEMS based polarization mode dispersion compensator in accordance with the present invention.

FIG. 3 schematically illustrates a polarization mode dispersion compensator 20 in accordance with the present invention. Transmitter 22 transmits optical input 24 through an optical fiber 26. For example, transmitter 22 can be a DFB laser modulator or any other type of modulated light source for producing an optical data signal. Optical fiber 26 is typically a long-haul, single-mode, dispersion-shifted fiber approximately one-hundred kilometers in length. More generally, any type of optical fiber can be used.

A portion of the optical input 24 is diverted by beam splitter 28 to a delay detector 30. The delay detector 30 detects propagation delays between the two orthogonal polarization modes of the detected light. The operation and implementations of such delay detectors is well-known and need not be described in further detail.

The majority of the optical input 24 passes through beam splitter 28 to a polarization-dependent beam splitter 32. The polarization-dependent beam splitter 32 is a type of polarization mode separator that separates the optical input 24 into first and second orthogonally polarized optical signs 34, 36. The second polarized signal 36 travels along a separate path 38 of fixed length. In the illustrated embodiment, the path 38 includes two mirrors 40, 42 that direct the second optical signal 36 to a beam combiner 44.

The first polarized signal 34 is directed to variable delay generator 48. The variable delay generator 48 includes first rotating micro-mirror 50 positioned to direct the first polarized signal 34 to one of a plurality of fixed mirrors 52A, 54A, 56A, 58A. Each of the fixed mirrors 52A, 54A, 56A, 58A includes a companion fixed mirror 52B, 54B, 56B, 58B, respectively, positioned to receive a reflected optical signal to a second rotating micro-mirror 60. The first and second rotating mirrors 50, 60 and the fixed mirrors 52A, 54A, 56A, 58A, 52B, 54B, 56B, 58B are preferably part of a micromechanical device constructed on the surface of a substrate.

The mirrors 52A, 54A, 56A, 58A and the mirrors 52B, 54B, 56B, 58B are preferably arranged in an overlapping configuration so that the first polarized signal 34 is not lost or dissipated between adjacent mirrors. Consequently, the signal strength remains relatively constant as the mirrors 50, 60 redirect the first polarized signal 34 from one fixed mirror to the next.

The second rotating micro-mirror 60 directs the delayed first polarized signal 72 to the beam combiner 44. The two orthogonally polarized optical signals 36, 72 are recombined by beam combiner 44. An optical output 74 having little or no polarization-mode dispersion is then directed to detector 76. Additional fibers, line amplifiers, and/or repeaters can also be included between the transmitter 22 and receiver 76. Receiver 76 can be any suitable photodetector for detecting the modulated optical data signal.

Each fixed mirror 52A, 54A, 56A, 58A and its companion 52B, 54B, 56B, 58B comprise optical paths 62, 64, 66, 68, respectively, of different lengths. In the illustrated embodiment, the optical paths 62, 64, 66, 68 are progressively longer. Although the embodiment of FIG. 3 illustrates the optical paths 62, 64, 66, 68 each requiring two fixed mirrors, additional fixed mirrors can be added to increase the length of one or more of the optical paths 62, 64, 66, 68.

The controller 70 receives data output from the delay detector 30 representing the magnitude of PMD. Controller 70 then processes the data and generates control signals to adjust the position of the micro-mirrors 50, 60 to select the optical path 62, 64, 66, 68 that will provide the required propagation delay to counteract the PMD effects of the long transmission path along fiber 26. Since the polarization mode dispersion compensator 20 uses rotating micro-mirrors 50, 60 to compensate for the detected delay, compensation on the order of nanoseconds can be achieved that is independent of the degree of propagation delay adjustment.

In one embodiment, the optical path 62 for the first polarized signal is equal to the optical path 38 for the second polarized signal. Consequently, the first polarized optical signal 34 can be delayed relative to the second polarized optical signal 36, but not visa versa.

In a second embodiment, the optical path 38 is greater than the optical paths 62 and 64, but less than the optical paths 66 and 68. By selecting the first or second optical paths 62, 64, the controller 70 can delay the second polarized optical signal 36 relative to the first polarized optical signal 34. By selecting the third path 66 or the fourth path 68, the controller 70 can delay the first polarized signal 34 relative to the second polarized optical signal 36.

The polarization mode dispersion compensator 20 may optionally be provided along optical fiber 26 near the receiver 76. According to the present invention, the PMD compensator 20 equalizes PMD which further increases bandwidth and transmission range. For example, given the presence of PMD compensator 20, transmitter 22 can transmit modulated laser data on the order of one to one-hundred Gb/s (gigabits/sec), or more, over a one-hundred kilometer single-mode fiber without intersymbol interference caused by PMD. Receiver 76 can detect the output reliably and accurately in a telecommunication environment.

Figure 4:
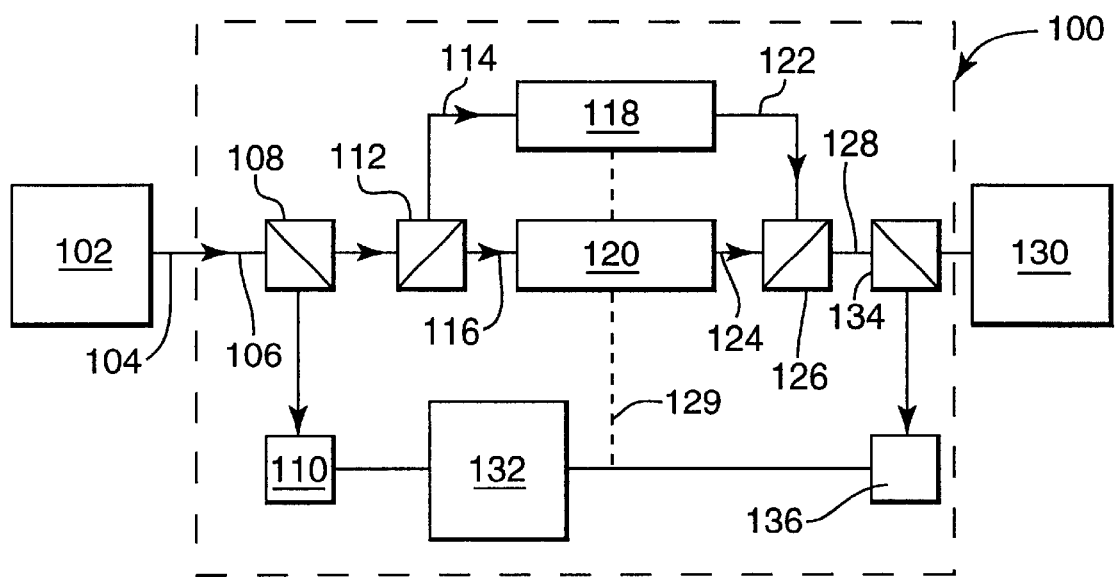
FIG. 4 is a schematic illustration of an alternate MEMS based polarization mode dispersion compensator in accordance with the present invention.

FIG. 4 schematically illustrates a second polarization mode dispersion compensator 100 in accordance with the present invention. Transmitter 102 transmits optical input 104 through an optical fiber 106. A portion of the optical input 104 is diverted by upstream beam splitter 108 to a delay detector 110. The delay detector 110 detects propagation delays between two orthogonal polarization modes of the detected light.

The majority of the optical input 104 passes through beam splitter 108 to a polarization-dependent beam splitter 112. The polarization-dependent beam splitter 112 is a type of polarization mode separator that separates the optical input 104 into first and second orthogonally polarized optical signs 114, 116.

The first polarized signal 114 is directed to first variable delay generator 118 and the second polarized signal 116 is directed to second variable delay generator 120. The first and second variable delay generators 118, 120 may or may not introduce a propagation delay into the first and second polarized signals 114, 116, respectively. The two orthogonally polarized optical signals 122, 124 emitted from the first and second variable delay generators 118, 120 are recombined by beam combiner 126. The resulting optical output 128 having little or no polarization-mode dispersion is then directed to detector 130. In one embodiment, a portion of the optical output 128 is diverted by downstream beam splitter 134 to a delay detector 136. The delay detector 136 detects propagation delays between two orthogonal polarization modes of the detected light in the recombined optical output signal 128.

Each of the variable delay generators 118, 120 provides a respective incremental propagation delay to optical signals 114, 116 passing therethrough to equalize or compensate for PMD. The degree of incremental propagation delay, if any, imparted by the variable delay generators 118, 120 is manipulated by control signals received over respective control line 129 from a controller 132. Controller 132 receives data output from the delay detector 110 representing the magnitude of PMD in the fiber 106. Controller 132 then processes the data and generates control signals for the variable delay generators 118, 120 to counteract the PMD effects, such as in a long transmission path along fiber 106. In one embodiment, the controller 132 monitors any remaining propagation delays in the recombined optical output signal 128 detected by delay detector 136 and transmits appropriate control signals to the variable delay generators 118, 120 in a closed loop control or servo system.

Figure 5:
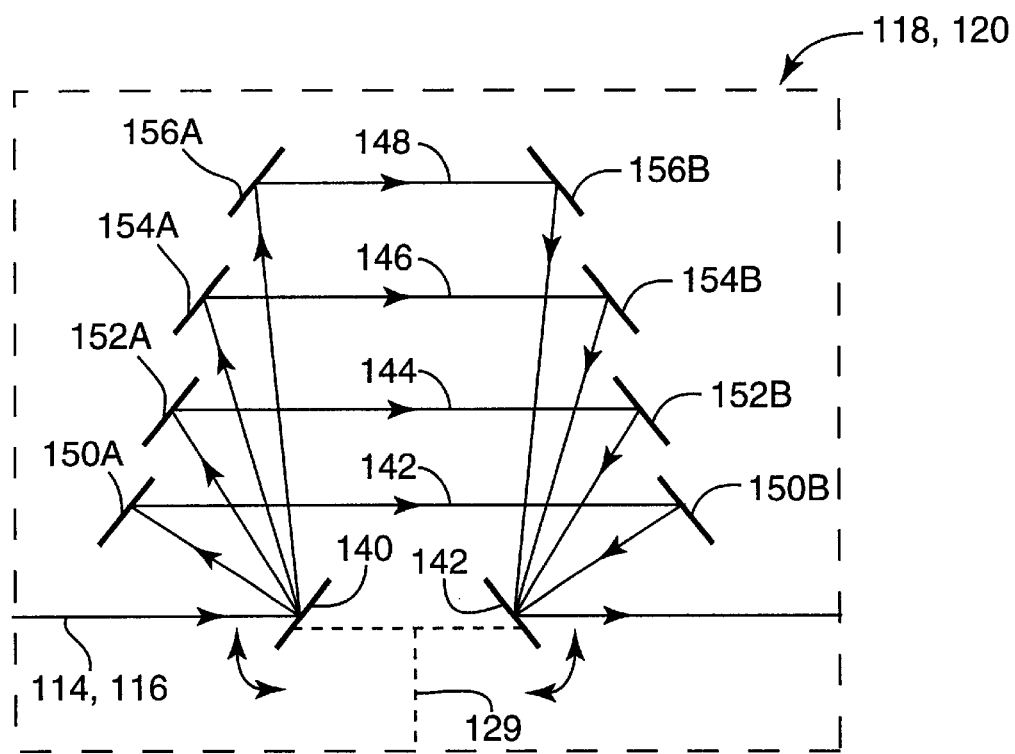
FIG. 5 is a schematic illustration of a variable delay generator in accordance with the present invention.

FIG. 5 illustrates one embodiment of a variably delay generator 118, 120 in accordance with the present invention. The controller 132 adjusts the position of two or more rotating mirrors 140, 142 within the variable delay generators 118, 120 to apply a propagation delay between the orthogonally polarized signals which compensates for the propagation delay detected by delay detector 110. As discussed in connection with FIG. 3, the rotating mirrors 140, 142 can direct the optical signals 114, 116 along a variety of optical paths 142, 144, 146, 148 of differing lengths. For example, path 142 may correspond to a 2 pico-second delay, path 144 a 4 pico-second delay, path 146 a 6 pico-second delay and path 148 an 8 pico-second delay.

The number and length of the optical paths available in the variable delay generators 118, 120 can be adjusted by altering the number and positioning of fixed mirrors 150A, 150B, 152A, 152B, 154A, 154B, 156A, 156B. As discussed above, the fixed mirrors are preferably arranged in an overlapping configuration so that the optical signals 114, 116 are not lost or dissipated in gaps between adjacent fixed mirrors. The rotating mirrors 140, 142 and the fixed mirrors 150A, 150B, 152A, 152B, 154A, 154B, 156A, 156B are preferably part of a micro-mechanical device constructed on the surface of a substrate.

Figure 6:
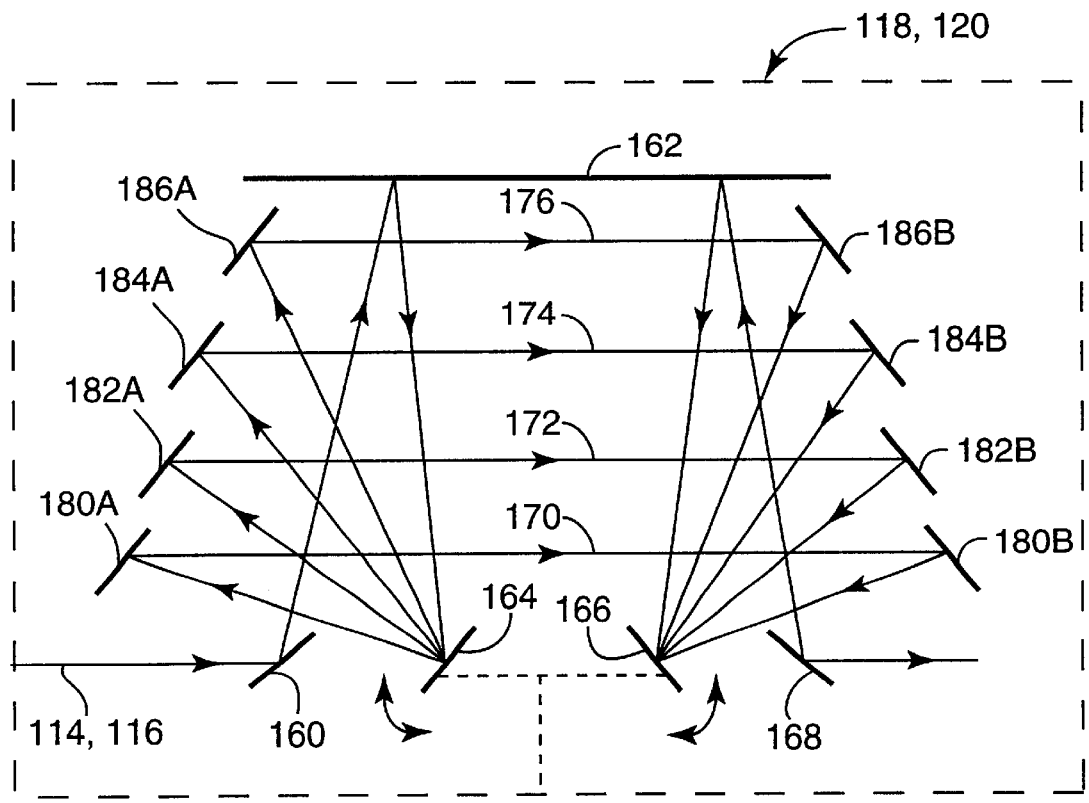
FIG. 6 is a schematic illustration of an alternate variable delay generator in accordance with the present invention.

FIG. 6 illustrates a second embodiment of a variably delay generator 118, 120 in accordance with the present invention. The optical signals 114, 116 are directed to fixed mirror 160 and then to fixed mirror 162. Fixed mirror 162 directs the optical signals 114, 116 to rotating mirror 164. The rotating mirror 164 directs the optical signals 114, 116 along a variety of optical paths 170, 172, 174, 176 of differing lengths comprising a plurality of fixed vertical mirrors 180A, 180B, 182A, 182B, 184A, 184B, 186A, 186B. Rotating mirror 166 directs the optical signals 114, 116 back to the fixed mirror 162 and then to fixed mirror 168. The controller 132 adjusts the position of the two rotating mirrors 164, 166 within the variable delay generators 118, 120 to apply a propagation delay between the orthogonally polarized signals which compensates for the propagation delay detected by delay detector 110. The fixed mirrors 160, 162, 168 increase the overall delay provided by the variable delay generators 118, 120 by a fixed amount.

Figure 7:
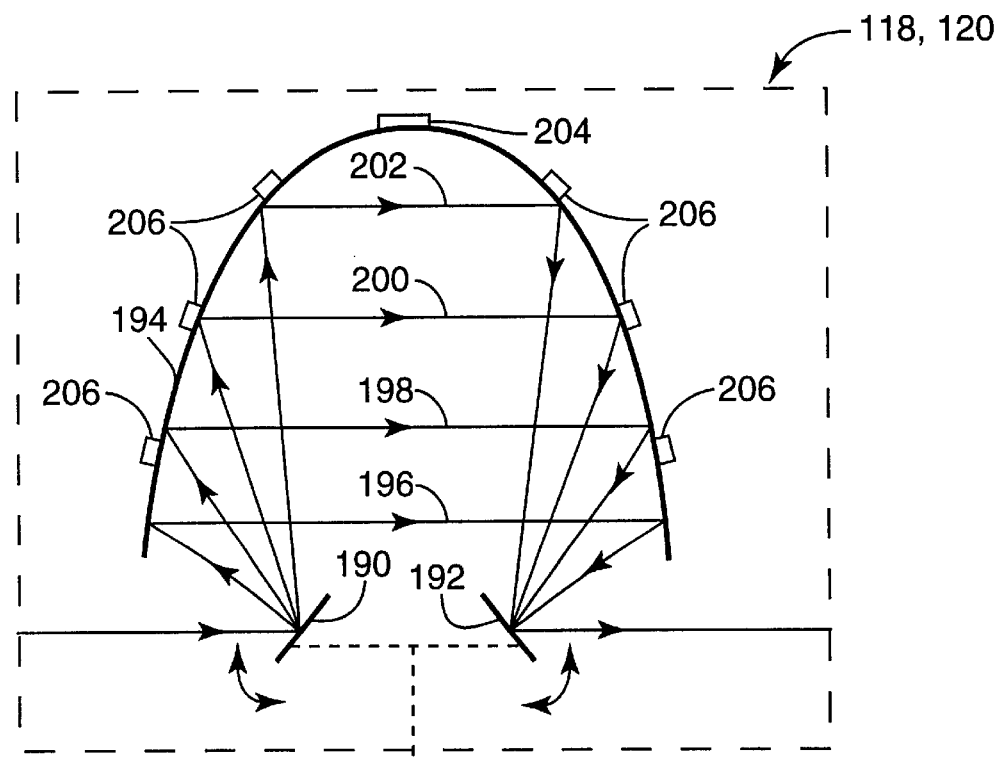
FIG. 7 is a schematic illustration of another alternate variable delay generator in accordance with the present invention.

FIG. 7 illustrates a third embodiment of a variably delay generator 118, 120 in accordance with the present invention. The controller 132 adjusts the position of two or more rotating mirrors 190, 192 within the variable delay generators 118, 120 to apply a propagation delay between the orthogonally polarized signals which compensates for the propagation delay detected by delay detector 110. The rotating mirrors 190, 192 direct the optical signals 114, 116 to a vertical parabolic mirror 194. Since the mirror 194 is a continuous surface, the rotating mirrors 190, 192 can theoretically direct the optical signals 114, 116 along an infinite number of optical paths. Optical paths 196, 198, 200, 202 are included for illustration purposes only.

In one embodiment, the mirror 194 is constructed on the surface of the substrate. A hinge 204 can optionally be formed at the center of the mirror 194. The mirror 194 is then raised to an upright position and folded into a parabolic shape. Retaining members 206 can optionally be formed on the surface of the substrate to hold the mirror 194 in the desired parabolic shape. Alternatively, a slot having the parabolic shape can be formed in the surface of the substrate to retain the mirror 194. In another embodiment, the mirror 194 is constructed as a separate component and positioned on the surface of the substrate.

The rotating micro-mirrors and fixed mirrors are preferably micro-mechanical devices. As used herein, "micro-mechanical device" refers to micrometer-sized mechanical, opto-mechanical, electromechanical, or opto-electro-mechanical device constructed on the surface of a substrate. Various technologies for fabricating micro-mechanical devices are available, such as for example the Multi-User MEMS Processes (MUMPs) from Cronos Integrated Microsystems located at Research Triangle Park, North Carolina. One description of the assembly procedure is described in "MUMPs Design Handbook," revision 5.0 (2000) available from Cronos Integrated Microsystems.

Polysilicon surface micromachining adapts planar fabrication process steps known to the integrated circuit (IC) industry to manufacture micro-electro-mechanical or micro-mechanical devices. The standard building-block processes for polysilicon surface micromachining are deposition and photolithographic patterning of alternate layers of low-stress polycrystalline silicon (also referred to a polysilicon) and a sacrificial material (e.g. silicon dioxide or a silicate glass). Vias etched through the sacrificial layers at predetermined locations provide anchor points to a substrate and mechanical and electrical interconnections between the polysilicon layers. Functional elements of the device are built up layer by layer using a series of deposition and patterning process steps. After the device structure is completed, it can be released for movement by removing the sacrificial material using a selective etchant such as hydrofluoric acid (HF) which does not substantially attack the polysilicon layers.

The result is a construction system generally consisting of a first layer of polysilicon which provides electrical interconnections and/or a voltage reference plane, and additional layers of mechanical polysilicon which can be used to form functional elements ranging from simple cantilevered beams to complex electromechanical systems. The entire structure is located in-plane with respect to the substrate. As used herein, the term "in-plane" refers to a configuration generally parallel to the surface of the substrate and the terms "out-of-plane" refer to a configuration greater than zero degrees to about ninety degrees relative to the surface of the substrate.

Typical in-plane lateral dimensions of the functional elements can range from one micrometer to several hundred micrometers, while the layer thicknesses are typically about 1–2 micrometers. Because the entire process is based on standard IC fabrication technology, a large number of fully assembled devices can be batch-fabricated on a silicon substrate without any need for piece-part assembly. The present micro-mechanical devices can be packaged using conventional IC packaging techniques. The package containing the micro-mechanical device can optionally be a vacuum or can be filled with nitrogen, argon or a variety of other gases.

Figure 8:
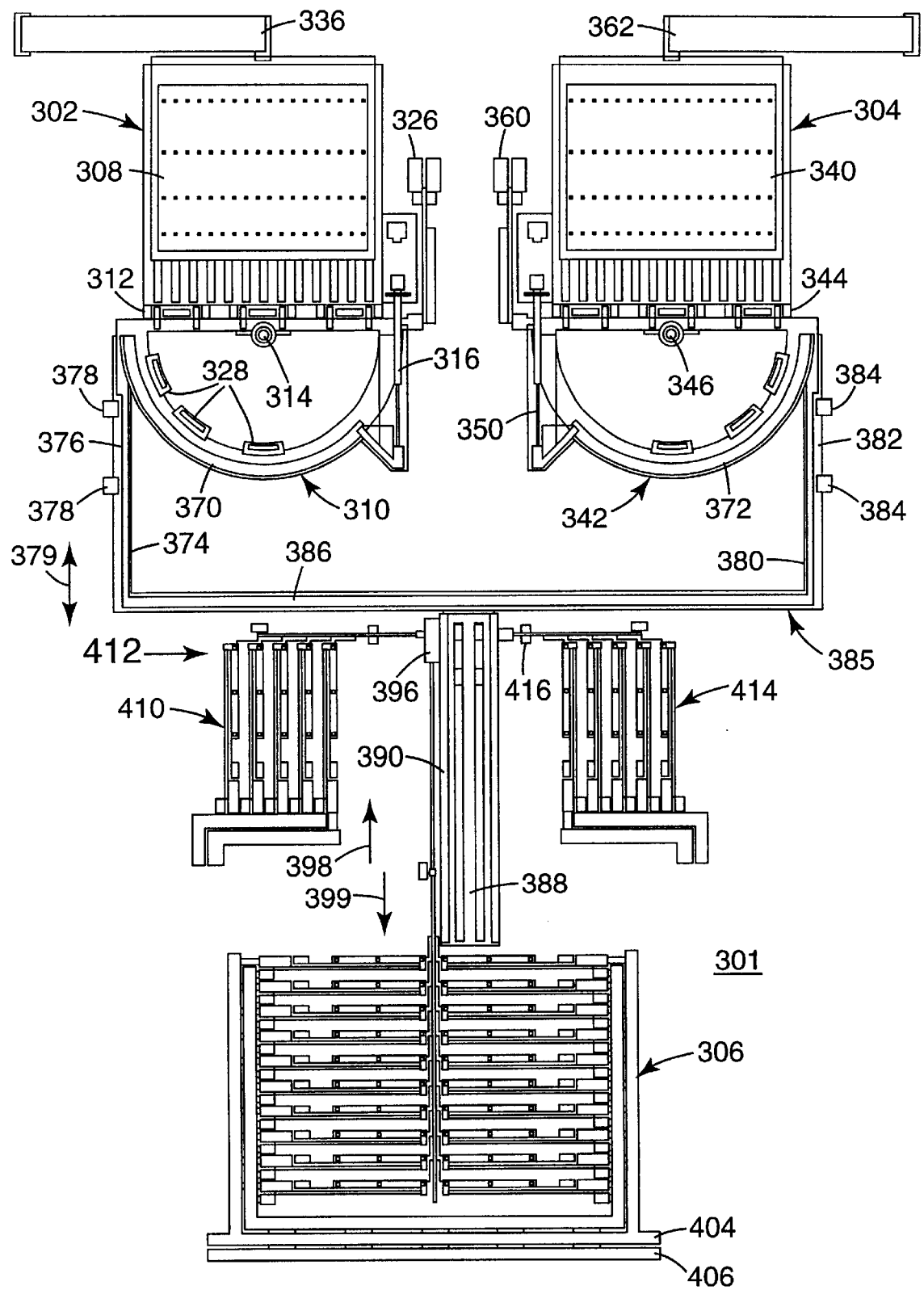
FIG. 8 is a top view of an exemplary rotating micro-mirror in accordance with the present invention.
Figure 9:
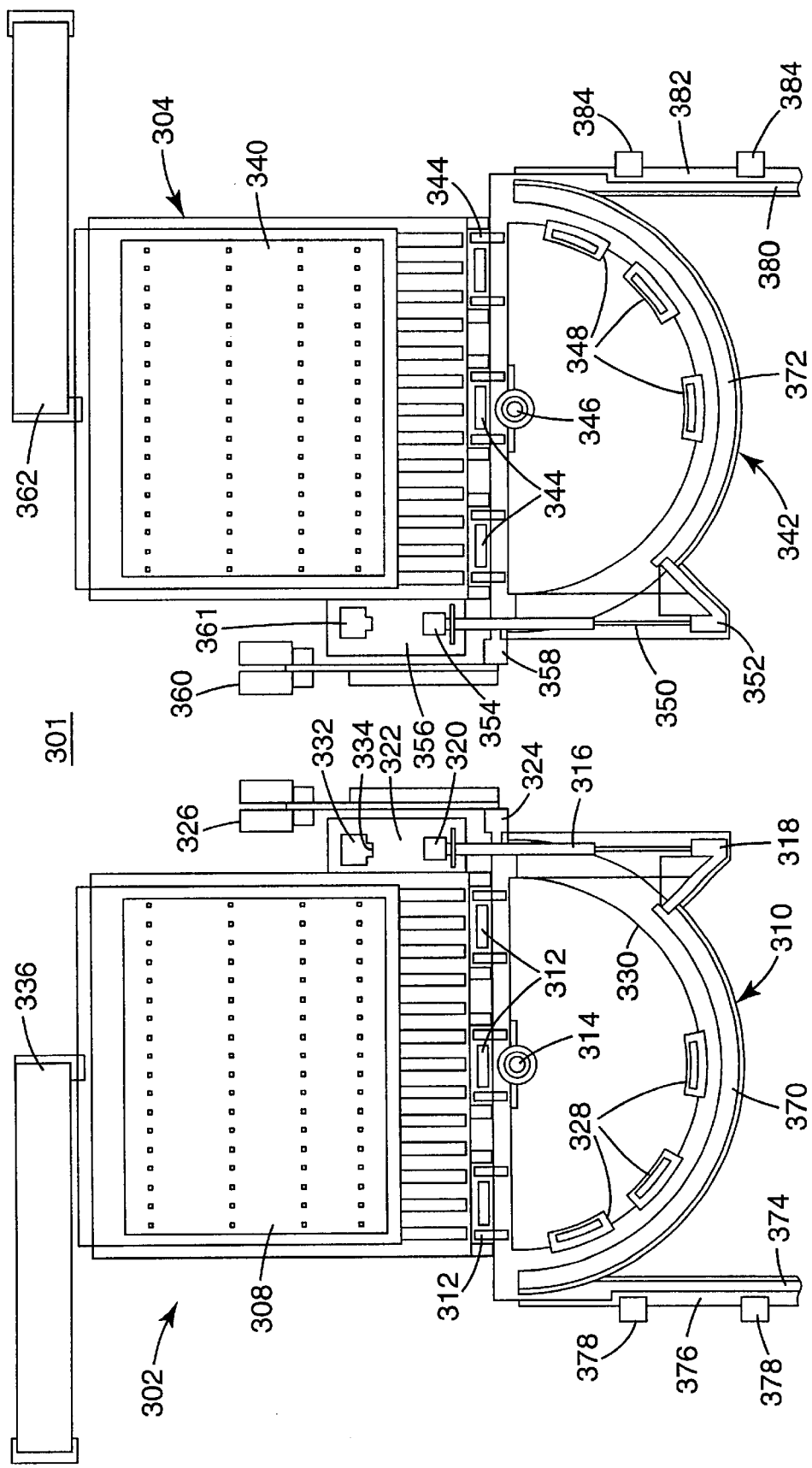
FIG. 9 is an enlarged view of a portion of the rotating micro-mirror of FIG. 8.
Figure 10:
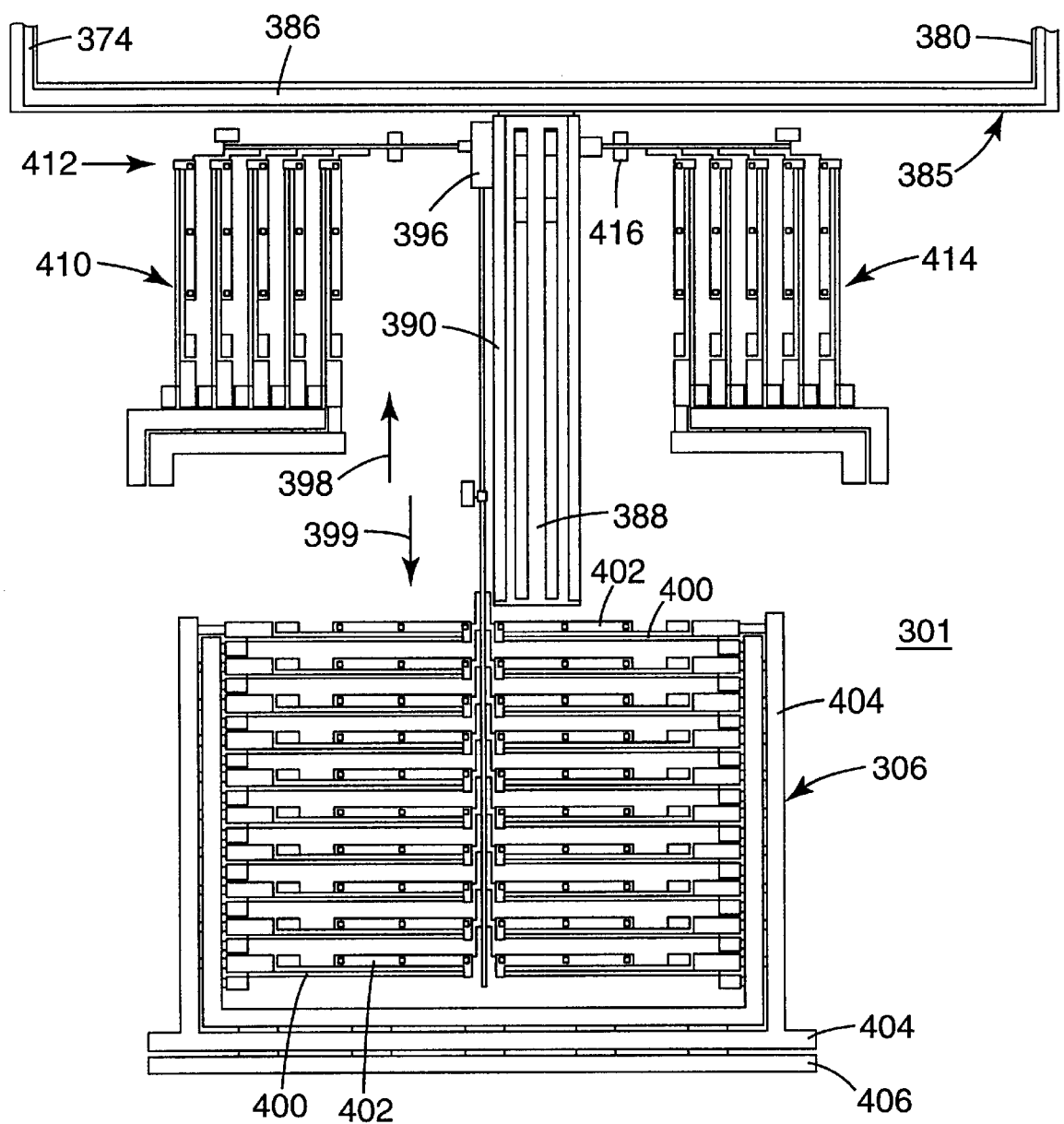
FIG. 10 is an enlarged view of another portion of the rotating micro-mirror of FIG. 8.

FIGS. 8–10 are top views of a micromechanical device 300 formed on a substrate 301 including rotating mirror assemblies 302, 304 operated by an array of thermal actuators 306. The rotating mirror assembly 302 includes a mirror 308 attached to a rotating base 310 by one or more hinges 312. The rotating base 310 is attached to the surface of the substrate 301 by a pivot 314 that permits the mirror 308 and the base 310 to rotate.

Latch arm 316 is attached to the rotating base 310 at first end 318. Free end 320 rests on portion 322 attached to the mirror 308. Distal end 324 of thermal actuator 326 is releasably engaged with the rotating base 310. When the thermal actuator 326 is actuated, the distal end 324 disengages from the rotating base 310 and permits the rotating mirror assembly 302 to rotate.

Supports 328 are located along inside curved surface 330 on the rotating base 310. The supports 328 are attached to the surface of the substrate 301 and extend over the inside surface 330, but are not attached to the rotating base 310. The supports 328 in combination with the pivot 314 restrain rotation of the rotating mirror assemblies 302 around a vertical access extending through the pivot 314.

Similarly, the rotating mirror assembly 304 includes a mirror 340 pivotally attached to a rotating base 342 by one or more hinges 344. Rotation of the base 342 around pivot 346 is restrained by supports 348. Latch arm 350 is attached to the rotating base 342 at first end 352. Free end 354 of the latch arm 350 rests on but is not attached to surface 356 that is attached to the mirror 340. Distal end 358 of thermal actuator 360 is releasably coupled with the rotating base 342 to restrict rotation.

The rotating mirror assemblies 302, 304 are formed in-plane on the surface of the substrate 301. After fabrication is completed, the mirrors 308, 340 are lifted out-of-plane. In the preferred embodiment, the mirrors 308, 340 are raised to a substantially vertical position relative to the surface of the substrate 301. As the mirror 308 is raised, free end 320 of the latch arm 316 slides along the surface 322 until it engages with latch hole 332. The latch hole 332 preferably includes a notch 334 that engages with free end 320 of the latch arm 316. Once engaged, the latch arm 316 retains the mirror 308 in the upright position. Similarly, free end 354 of the latch arm 350 engages with latch hole 361.

The mirrors 308, 340 can be raised manually or by a series of actuators. In the illustrated embodiment, springs 336 and 362 are positioned to raise the mirrors 308, 340, respectively, slightly off the surface of the substrate 301. Once in the partially raised configuration, the mirrors 308, 340 can be manually raised to the upright position.

The rotating bases 310, 342, each include a toothed edge 370, 372 respectively. The toothed edge 370 is mechanically coupled to toothed edge 374 on side member 376. Supports 378 attached to the surface of the substrate 301 retain the side member 376 adjacent to the rotating base 310, while permitting sliding movement parallel to axis 379. Similarly, the toothed edge 372 of the rotating base 342 is mechanically coupled with a toothed edge 380 on side member 382. Side supports 384 attached to the surface of the substrate 301 provide a positive lock between the toothed edges 372, 380 while permitting sliding movement parallel to axis 379. Cross member 386 is connected to the side members 376, 382. The side members 376, 382 and the cross member 386 comprise a linkage mechanism 385 that synchronizes the rotation of the mirrors 308, 340.

The cross member 386 is mechanically coupled to member 388. The member 388 includes toothed edges 390, 392 on each side. An array of thermal actuators 306 is mechanically coupled to arm 394 having a toothed member 396. The toothed member 396 can be coupled with the toothed edge 390 of the member 388.

The array of thermal actuators 306 is configured to provide displacement in a direction 398 parallel to the surface of the substrate 301. In particular, each of the thermal actuators includes a hot arm 400 and a cold arm 402. When current is applied to the hot and cold arms 400, 402 through the traces 404, 406, the hot arm 400 thermally expands to a greater extent than the cold arm 402. Consequently, when current is applied to the array of thermal actuators 306, the toothed member 396 is displaced in the direction 398. When current is removed from the array of thermal actuators 306, the toothed member 396 moves in the direction 399, back to its original unactivated position.

Various thermal actuator structures can be used in the present invention, such as disclosed in commonly assigned U.S. patent applications entitled "Direct Acting Vertical Thermal Actuator", filed Sep. 12, 2000, Ser. No. 09/659,572 and "Direct Acting Vertical Thermal Actuator with Controlled Bending", filed Sep. 12, 2000, Ser. No. 09/659,798.

A secondary array of thermal actuators 410 is located adjacent to the toothed member 396 to provide a biasing force in the direction 412. When the thermal actuators 410 are in an unactivated state, the toothed member 396 is not engaged with the toothed edge 390. Consequently, the toothed member 396 can be engaged and disengaged with the toothed edge 390 by applying current to the thermal actuators 410. A third array of thermal actuators 414 is located on the opposite side from the array 410. Toothed member 416 is provided to releasably engage with the tooth edge 392.

In operation, the thermal actuators 410 are activated to releasably couple the toothed member 396 with the toothed edge 390. Subsequently, the array of thermal actuators 306 are activated to displace the toothed member 396 in the direction 398. The displacement of the member 388 is imparted to the toothed edges 370, 372 of the rotating bases 310, 342, respectively, by the side members 376, 382. The coupling of the toothed edges 374, 370 and 372, 380 imparts a torque on the rotating bases 310, 342 that is transmitted to the mirrors 308, 340, respectively.

Thermal actuators 414 are then activated so that member 416 couples with toothed edge 392 on the member 388. The member 416 serves to hold the member 388 in position while the toothed member 396 is disengaged from the toothed edge 390.

The thermal actuators 410 are deactivated to disengage the toothed member 396 from the toothed edge 390. Once the toothed member 396 is disengaged, the thermal actuators 306 are deactivated so that they return to their neutral position, causing the toothed member 396 to move in the direction 399. The thermal actuators 410 can then be reactivated to reengage the toothed member 396 with the toothed edge 390 in preparation for reactivation of the thermal actuators 306. Once the toothed member 396 is reengaged with the toothed edge 390, the thermal actuators 414 are deactivated so that the member 416 is disengaged from the toothed edge 392. The thermal actuators 306 are then reactivated and the whole process is repeated.

Movement of the member 388 in the direction 398 causes the mirror 308 to rotate in a clockwise direction. Simultaneously, the mirror 340 rotates in a counter-clockwise direction. The linkage system used for imparting this rotation causes the amount of rotation of each mirror 308, 340 to be substantially the same. The structure of FIGS. 8–10 synchronizes the rotation of the mirrors 308, 340 with minimal error.

In order to move the mirrors 308, 340 in the opposite direction, the entire procedure is reversed. First, the thermal actuators 306 advance the toothed member 396 along the edge of the member 388 without being engaged with the toothed edge 390. Once the toothed member 396 is fully advanced in the direction 398, the thermal actuators 410 are actuated so that the toothed member 396 engages with the toothed edge 390. The thermal actuators 414 are deactivated so the member 416 is disengaged from the member 388. Deactivating the thermal actuators 306 causes the toothed member 396 to be pulled in the direction 399. The thermal actuators 414 are then activated so the member 416 locks the member 388 in position while the procedure is repeated.

FIG. 11 is a top view of an alternate micromechanical device 450 including a single rotating mirror assembly 452 and an array of thermal actuators 454. Mirror 456 is attached to rotating base 458 off center. In the illustrated embodiment, edge 460 of the mirror 456 is generally aligned with pivot 462. Thermal actuators 464 are provided to partially raise the mirror 456. In another embodiment, the thermal actuators 464 are adapted to raise the mirror substantially vertically until the latch arm 466 engages with latch hole 468.

Rotating base 458 includes a toothed edge 470 that intermittently engages with a toothed member 472. In order to rotate the mirror 456 in the clockwise direction, thermal actuators 476 are activated to bias the toothed member 472 against the toothed edge 470 of the rotating base 458. The array of thermal actuators 454 are then activated so as to displace the toothed member 472 in the direction 474. The thermal actuators 476 are then deactivated to disengage the toothed member 472 from the rotating base 458. The thermal actuators 454 are then deactivated so that the toothed member 472 moves in the direction 478. The array 476 is then activated to reengage the toothed member 472 with the rotating base 458 and the process is repeated.

To rotate the mirror 456 in the counter-clockwise direction, the above noted process is reversed. The array 454 is activated before the toothed member 472 is biased against the rotating base 458. Once the toothed member 472 is displaced in the direction 474, the array 476 is activated to bias the toothed member 472 to the toothed edge 470. The array 454 is then deactivated so that the toothed member 472 is pulled in the direction 478.

Other rotating micro-mirror designs are disclosed in a commonly assigned U.S. patent application entitled "Switch Based on Rotating Micro-Mirror" and Butler et al., "Scanning and Rotating Micromirrors Using Thermal Actuators", 3131 SPIE 134–144 (1997).

All of the patents and patent applications disclosed herein, including those set forth in the Background of the Invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

What is claimed is:

1. An apparatus for equalizing polarization mode dispersion in an optical signal traveling through an optical fiber, comprising:
   a polarization mode separator that separates the optical signal into a first polarized signal and a second differently polarized signal traveling along respective first and second paths;
   a first variable delay generator located along the first path adapted to selectively provide a first propagation delay to the first polarized signal, the first variable delay generator comprising at least two rotating micro-mirrors and one or more fixed mirrors constructed on a surface of a substrate, the fixed mirrors comprising a plurality of optical paths of differing lengths adapted to optically couple with the two rotating micro-mirrors;
   a controller coupled to the first variable delay generator, the controller adapted to monitor the polarization mode dispersion in the optical signal and to position the rotating micro-mirrors to direct the first polarized signal along one of the plurality of optical paths; and
   a beam combiner coupled to the first and second optical paths after the first variable delay generator, the beam combiner combining the first and second signals to form an optical output signal substantially compensated for polarization mode dispersion.

2. The apparatus of claim 1 wherein the second differently polarized signal travels along an optical path of a fixed length to the beam combiner.

3. The apparatus of claim 2 wherein all of the plurality of optical paths are greater than or equal to the path of fixed length.

4. The apparatus of claim 2 wherein some of the plurality of optical paths are greater than the path of fixed length and some of the plurality of optical paths are less than or equal to the path of fixed length.

5. The apparatus of claim 1 comprising a second variable delay generator located along the second path before the beam combiner adapted to selectively provide a second propagation delay to the second polarized signal, the controller also being coupled to the second variable delay generator.

6. The apparatus of claim 1 wherein the first and second polarized optical signals are polarized in orthogonal modes.

7. The apparatus of claim 1 wherein the polarization mode separator comprises a polarization-dependent beam splitter.

8. The apparatus of claim 1 comprising:
   a beam splitter optically coupled between the optical fiber upstream of the polarization mode separator; and
   a delay detector optically coupled to the beam splitter and operatively coupled to the controller, wherein the beam splitter diverts a portion of the optical signal to the delay detector.

9. The apparatus of claim 1 comprising:
   a beam splitter optically coupled between the optical fiber downstream of the polarization mode separator; and
   a delay detector optically coupled to the beam splitter and operatively coupled to the controller, wherein the beam splitter diverts a portion of the optical signal to the delay detector.

10. The apparatus of claim 1 wherein each of the plurality of optical paths comprises two fixed mirrors.

11. The apparatus of claim 1 wherein the fixed mirror comprise a plurality of fixed mirrors arranged in an overlapping configuration so that the first polarized signal is not lost or dissipated between adjacent mirrors.

12. The apparatus of claim 1 wherein the plurality of optical paths comprise progressively increasing delays in the first polarized signal.

13. The apparatus of claim 1 wherein the one or more fixed mirrors comprise a single parabolic mirror.

14. The apparatus of claim 1 comprising a linkage mechanism mechanically coupled to the two rotating micro-mirrors.

15. The apparatus of claim 14 comprising a plurality of thermal actuators mechanically coupled to the linkage mechanism.

16. The apparatus of claim 14 wherein the linkage mechanism rotates the micro-mirrors simultaneously in opposite directions.

17. The apparatus of claim 14 wherein the linkage mechanism synchronizes rotation of the micro-mirrors.

18. The apparatus of claim 1 comprising a plurality of variable delay generators on the substrate.

19. The apparatus of claim 1 comprising an optical communication system including at least one apparatus for equalizing polarization mode dispersion.

20. An apparatus for equalizing polarization mode dispersion in an optical signal traveling through an optical fiber, comprising:
    a polarization mode separator that separates the optical signal into a first polarized signal and a second differently polarized signal traveling along respective first and second paths;

a first variable delay generator located along the first path adapted to selectively provide a first propagation delay to the first polarized signal, the first variable delay generator comprising a pair of rotating micro-mirrors, a linkage mechanism adapted to synchronize rotation of the micro-mirrors, and one or more fixed mirrors constructed on a surface of a substrate, the fixed mirrors comprising a plurality of optical paths of differing lengths adapted to optically couple with the two rotating micro-mirrors;

a controller coupled to the first variable delay generator, the controller adapted to monitor the polarization mode dispersion in the optical signal and to position the rotating micro-mirrors to direct the first polarized signal along one of the plurality of optical paths; and a beam combiner coupled to the first and second optical paths after the first variable delay generator, the beam combiner combining the first and second signals to form an optical output signal substantially compensated for polarization mode dispersion.

21. An apparatus for equalizing polarization mode dispersion in an optical signal traveling through an optical fiber, comprising:

a polarization mode separator that separates the optical signal into a first polarized signal and a second differently polarized signal traveling along respective first and second paths;

a first variable delay generator located along the first path adapted to selectively provide a first propagation delay to the first polarized signal, the first variable delay generator comprising at least two rotating micro-mirrors and one or more fixed mirrors constructed on a surface of a substrate, the fixed mirrors comprising a plurality of optical paths of differing lengths adapted to optically couple with the two rotating micro-mirrors;

a second variable delay generator located along the second path adapted to selectively provide a second propagation delay to the second polarized signal, the second variable delay generator comprising at least two rotating micro-mirrors and one or more fixed mirrors constructed on a surface of a substrate, the fixed mirrors comprising a plurality of optical paths of differing lengths adapted to optically couple with the two rotating micro-mirrors;

a controller coupled to the first and second variable delay generators, the controller adapted to monitor the polarization mode dispersion in the optical signal and to position the rotating micro-mirrors to direct the first and second polarized signals along one of the plurality of optical paths; and a beam combiner coupled to the first and second optical paths after the first and second variable delay generators, the beam combiner combining the first and second signals to form an optical output signal substantially compensated for polarization mode dispersion.

* * * * *